3,373,123
COMPOSITION OF MATTER AND GOLF BALL MADE THEREFROM
George H. Brice, Glen Rock, N.J., assignor to Uniroyal, Inc., a corporation of New Jersey
No Drawing. Filed Oct. 11, 1965, Ser. No. 494,902
9 Claims. (Cl. 260—2.5)

ABSTRACT OF THE DISCLOSURE

The invention is a composition of matter comprising a blend of hard crystalline polytetrahydrofuran and an elastomer such as cis-polybutadiene, styrene-butadiene copolymer, or natural rubber. The invention is also a molded golf ball or golf core comprising a vulcanized blend of aforesaid components, optionally with added filler.

---

This invention relates to a new composition of matter and to a new and improved golf ball made therefrom. More particularly, my invention is directed to a golf ball or golf ball core molded from a tough, hard, crystalline, resilient polymer such as high molecular weight polytetrahydrofuran or from combinations of same with soft, elastomeric polymers such as hevea, SBR or cis-polybutadiene. Suitable fillers are used when required for weighting and coloration. Other fillers of a cellular or porous nature may also be used to provide the special characteristics of "sound" or "click" when the ball is dropped on a hard surface or hit with a golf club. Hardness, also, may be developed by incorporation of these and other suitable fillers where the formulation would be too soft otherwise.

Present-day golf balls are rather complicated structures consisting of a small solid or liquid-filled rubber center about which is wound a vulcanized rubber thread or tape to form the ball core. The rubber threads are stretched to very high elongations during the winding operation in order to produce a core with sufficient hardness. Generally speaking, the higher quality balls require very hard cores and the process of producing such cores is complicated by thread breakage, variations in the winding operation and other critical factors which are difficult to control. The wound thread cores are then encased with a tough, cut-resistant, protective cover such as balata. Great care must be exercised during the cure of this covering material to prevent damage to the wound rubber thread core from excessive heat. A rather elaborate low temperature cure system has been developed for curing the balata cover, thus adding to the complexity and cost of producing a good quality golf ball. Methods of making these prior art balls are set forth in U.S. Patents 2,344,873; 2,354,017; 2,319,163; and 2,360,090.

Prior art golf balls have also been made by molding mixtures of various materials. Completely molded balls can be prepared from many materials and combinations of materials to give either high hardness or high resilience but it is the combination of these two properties in a single formulation which is difficult to achieve. Molded balls made from soft amorphous elastomers only as the base polymer depend either upon the addition of mineral fillers and/or cellular materials or upon high-sulfur curing recipes to develop hardness. Balls so hardened lack the necessary deep resilience required to obtain long flight when struck with a club. Prior art methods of making all molded balls are described in U.S. Patents 1,098,609, 1,115,240, 2,258,332, 2,258,333, 2,558,860, 2,621,166 and British Patent 494,031.

In the present invention the defects and limitations of prior golf balls are overcome by using blends of a meltable, hard, crystalline polymer (polytetrahydrofuran) with an amorphous resilient polymer (cis-polybutadiene). These blends, which inherently possess a high degree of hardness in and of themselves at room temperature by virtue of the crystalline component, can be made still harder by milling or mixing into the melted polymer blend various types of fillers and additives with minimal reduction in resilience. When in the melted condition at milling and processing temperatures, these polymer blends are equivalent to completely amorphous polymer in their capacity to accept fillers. When these filled stocks are cured and allowed to age sufficiently to allow crystallization to take place, they develop superior hardness. Balls with a cellular structure can be produced by incorporating cellular or porous materials such as sawdust, ground nutshells, or porous or hollow plastic materials which retain their particulate shape at milling and processing temperatures. The latter are exemplified by porous PVC particles and "Microballoons." Alternatively, a cellular structure may also be imparted to the molded ball by incorporating blowing agents and allowing the ball to expand in the mold before or during cure.

Therefore, it is an object of the present invention to provide an all-molded golf ball by combining hard, tough, crystalline polymers such as polytetrahydrofuran with soft, amorphous, highly resilient polymers such as cis-polybutadiene. Polymer blends with as high as 95% and as low as 5% by weight of crystalline polymer can be used to advantage in the present invention. However, the preferred range is from 50 to 95% of crystalline polymer in the blend, it being understood that the compositions with a lower percentage of crystalline polymer will require a higher level of hardening filler.

The crystalline polymer, high molecular weight polytetrahydrofuran, upon which this invention is based, can be made by several methods. High molecular weight homopolymer of tetrahydrofuran can be made by using rather high (5 to 20%) concentrations of boron trifluoride catalyst. This method is described in the literature by R. C. Burrows and B. F. Crowe, J. App. Pol. Science, VI, No. 22, 465–473 (1962). Alternatively, copolymers of THF with small amounts of other cyclic oxides (5 mole-percent or less) such as those described in British Patent 834,158 are also suitable. Still a third method of preparation is described in a general way by H. Meerwein, D. Delfs and H. Morschel, Angew. Chemie, 72, 927–34 (1960). The method used in the present instance to prepare large quantities of crystalline polytetrahydrofuran with small concentrations of catalysts is based on the latter reference. It is described in detail below. Regardless of which method is used, I have found that crystalline polymers or copolymers exhibiting an intrinsic viscosity of from 1.0 to 6.0 or higher are suitable materials for the practice of this invention.

PREPARATION OF HIGH MOLECULAR WEIGHT POLYTETRAHYDROFURAN (PTHF)

The polytetrahydrofuran used in the recipes shown hereinafter was prepared as follows:

To a cold solution of 2180 g. of dry commercial tetrahydrofuran and 2.37 ml. of epichlorohydrin was added 3.76 ml. of boron trifluoride etherate. The combined reagents which were contained in a tightly covered dry glass jar were covered with a blanket of argon and allowed to polymerize at $-15°$ C. for 120 hours. At the end of this time the original clear colorless fluid had turned to a hard, white, opaque solid. This was allowed to warm to room temperature, then treated with sufficient 500/10/10 THF/$H_2O$/$NH_4OH$ solution to soften it so that it could be removed from the container. The neutralized taffy-like product was rolled out to about ¼" thickness, and solvent and other volatiles were removed by heating in an air oven at 100 to 125° F.; drying was completed by milling at 200 to 225° F. for several minutes. The weight of product was 65% of that of the starting tetrahydrofuran, and the product had an intrinsic viscosity of 3.26 in tetrahydrofuran at 30° C.

Examples

Solid, monolithic golf balls were molded from the compositions listed below, and were found to be hard, tough, cut-resistant and durable. When dropped on a hard surface or hit with a golf club they produce a "click" or "sound" quite similar to that of a conventional wound-core ball. All compositions were prepared by mixing on a rubber mill at 140 to 160° F. The compounded stock was sheeted out, cut into strips, tightly rolled into a cylinder, then molded and cured in golf ball molds such as are used for molding covers onto wound-thread cores. Cure time was for 20 or 30 min. at 200° F. The cured balls were allowed to age and harden at room temperature for two weeks to develop optimum properties for final testing.

|  | 1 | 2 | 3 | 4 | 5 |
|---|---|---|---|---|---|
| Composition (parts by weight): | | | | | |
| PTHF | 40 | 50 | 40 | 40 | 40 |
| Cis-4 [1] | 60 | 50 | 60 | 60 | 60 |
| Lead carbonate | 25 | | | | 20 |
| Titanium dioxide | 5.0 | 5.0 | 5.0 | 5.0 | 5.0 |
| N,N'-m-phenylenebismaleimide | 3.0 | 3.0 | 3.0 | 3.0 | 3.0 |
| Alpha, alpha'-azobisisobutyronitrile | 0.75 | 0.75 | 0.75 | 0.75 | 0.75 |
| PVC Pearls [2] | 40 | | | | |
| "L" glass beads [3] | | 30 | 40 | | |
| Urea-formaldehyde Microballoons [4] | | | 30 | | |
| Ground walnut shells | | | | 75 | |
| Wood flour | | | | | 40 |
| Properties of Ball: | | | | | |
| Ball Wt., g | 45.6 | 44.5 | 45.5 | 44.0 | 45.0 |
| Percent Rebound (ultimate) | 71 | 70 | 68 | 69 | 70 |
| Hardness (Shore C) | 57 | 55 | 70 | 68 | 65 |

[1] Cis-polybutadiene available from Phillips Petroleum Company.
[2] Porous particles of polyvinyl chloride available from Escambia Chemical Corporation.
[3] Small, dust-like glass spheres available from Potters Brothers, Inc.
[4] Hollow urea-formaldehyde resin spheres available from Sohio Chemical Company.

The data shown on the foregoing examples demonstrate that hard, highly resilient golf balls of the proper density can be made from blends of crystalline polytetrahydrofuran with amorphous, resilient elastomers. These balls are tough, durable and cut-resistant.

While I have described my invention with particular reference to a golf ball, I believe that the composition of matter described herein is novel and I therefore claim said composition broadly regardless of the form in which it is manifested.

Having thus described my invention, what I claim and desire to protect by Letters Patent is:

1. A molded golf ball comprised of a vulcanized blend of from 5 to 95 parts by weight of hard crystalline polytetrahydrofuran and 95 to 5 parts by weight of an elastomer selected from the group consisting of cis-polybutadiene homopolymer, styrene-butadiene copolymer, and natural rubber.

2. A molded golf ball comprising an intimate mixture of from 25 to 75 phr. of filler with a vulcanized blend of from 5 to 95 parts by weight of hard crystalline polytetrahydrofuran and correspondingly 95 to 5 parts by weight of an elastomer selected from the group consisting of cis-polybutadiene homopolymer, styrene-butadiene copolymer, and natural rubber.

3. A molded golf ball as in claim 2, wherein the elastomer is cis-polybutadiene homopolymer.

4. A molded golf ball as in claim 2, wherein the filler is lead carbonate.

5. A molded golf ball as in claim 2, wherein the filler is porous particles of polyvinyl chloride.

6. A molded golf ball as in claim 2, wherein the filler is hollow urea-formaldehyde resin spheres.

7. A molded golf ball as in claim 2, wherein the filler is ground walnut shells.

8. A molded golf ball as in claim 2, wherein the filler is wood flour.

9. A composition of matter comprising a blend of from 5 to 95 parts by weight of hard crystalline polytetrahydrofuran and 95 to 5 parts by weight of an elastomer selected from the group consisting of cis-polybutadiene homopolymer, styrene-butadiene copolymer and natural rubber.

References Cited
UNITED STATES PATENTS

| | | |
|---|---|---|
| 3,238,156 | 3/1966 | Kohrn. |
| 3,308,205 | 3/1967 | Bugel _____ 260—887 |
| 3,310,504 | 3/1967 | Vandenberg _____ 26—23 |

MURRAY TILLMAN, *Primary Examiner.*

M. FOELAK, *Assistant Examiner.*